(12) United States Patent
Litz

(10) Patent No.: US 6,575,436 B2
(45) Date of Patent: Jun. 10, 2003

(54) EVAPORATIVE COOLER

(75) Inventor: Raymond A. Litz, Strongsville, OH (US)

(73) Assignee: Koolrayz Ind., LLC, Elyria, OH (US)

( * ) Notice: Subject to any disclaimer, the term of this patent is extended or adjusted under 35 U.S.C. 154(b) by 0 days.

(21) Appl. No.: 09/862,929

(22) Filed: May 22, 2001

(65) Prior Publication Data

US 2002/0145209 A1 Oct. 10, 2002

Related U.S. Application Data

(60) Provisional application No. 60/282,216, filed on Apr. 6, 2001.

(51) Int. Cl.$^7$ ............................................. B01F 3/04
(52) U.S. Cl. ........................... 261/27; 261/66; 261/98; 261/99; 261/107; 261/DIG. 3
(58) Field of Search ............................ 261/26, 27, 66, 261/97, 98, 99, 106, 107, DIG. 3, DIG. 43

(56) References Cited

U.S. PATENT DOCUMENTS

| | | | | |
|---|---|---|---|---|
| 2,391,558 A | * | 12/1945 | Essick | 261/97 |
| 2,517,998 A | * | 8/1950 | Cilchrist, Jr. et al. | 261/97 |
| 2,557,276 A | * | 6/1951 | Gerow | 261/97 |
| 2,606,009 A | * | 8/1952 | Long | 261/97 |
| 3,867,486 A | | 2/1975 | Nagele | 261/29 |
| 4,261,930 A | | 4/1981 | Walker | 261/92 |
| 4,386,038 A | | 5/1983 | Walker | 261/80 |
| 4,428,890 A | * | 1/1984 | Harrell | 261/106 |
| 4,968,457 A | * | 11/1990 | Welch | 261/98 |
| 5,374,381 A | | 12/1994 | Schuld et al. | 261/106 |
| 5,966,953 A | * | 10/1999 | Murr et al. | 261/27 |
| 6,338,471 B1 | * | 1/2002 | Imsdahl et al. | 261/66 |
| 6,394,427 B1 | * | 5/2002 | Guetersloh et al. | 261/99 |

* cited by examiner

Primary Examiner—C. Scott Bushey
(74) Attorney, Agent, or Firm—Fay, Sharpe, Fagan, Minnich & McKee, LLP

(57) ABSTRACT

An evaporative cooler (10) includes a housing having aligned upper and base panels (40, 50), and one or more air pervious side panels (70) peripherally disposed therebetween. An air inlet (52) is formed in the upper panel and the base panel collects excess water. An air pervious evaporative pad (80) formed of a fibrous material is enclosed within the housing and has a recess (82) formed therein which opens toward the air inlet. A fan (30) secured to the top panel delivers air ambient the fan into the housing and through the evaporative pad where it is cooled by an evaporative process, and the cooled air is discharged through the air outlets. A conduit and flow control system (21, 26, 27, 28, 29) is provided to supply evaporation water (25) to the evaporative pad at a rate substantially equal to the rate at which the water evaporates from the pad.

30 Claims, 5 Drawing Sheets

EVAPORATIVE COOLER

RELATED APPLICATION

This application claims the benefit under 35 U.S.C. §119 (e) of U.S. provisional application Ser. No. 60/282,216, filed Apr. 6, 2001, now abandoned. Said U.S. provisional application Ser. No. 60/282,216 is incorporated herein by reference in its entirety.

BACKGROUND OF THE INVENTION

The present invention relates generally to evaporative cooling devices and, more particularly, to a lightweight evaporative cooler which is highly efficient, resistant to spillage, inexpensive, and easy to construct. The evaporative cooler of the present invention finds particular utility as a roof-mounted unit for providing sensible cooling of an interior compartment of a moving vehicle or other movable structure, such as automobiles, vans, buses, recreational vehicles, motor homes, travel trailers, pop-up campers, cargo/parcel distribution vehicles, horse trailers, livestock trailers, watercraft, tents and other portable dwellings, and the like, and will be described in particular reference thereto. However, it will be recognized that the present invention is also applicable to cooling interior spaces of buildings, dwellings, and the like, as well as other structures and interior confines, or otherwise for providing a cooled and/or humidified environment to animals, plants, humans, fish, perishable items or temperature-sensitive items, or any other organic or man-made substance that would benefit from cooling and/or humidification.

In conventional evaporative coolers, water is circulated in a downward direction on a vertically mounted pad. The free flowing water encounters air that is pulled horizontally through the pad. The conventional pad design employing free flowing water is disadvantageous in that it floods or covers the surface of the pad, thus reducing the surface area of the evaporative material available to make contact with the air. Such conventional coolers are fashioned after industrial cooling tower design and circulate large volumes of water past large volumes of air. The result is that the both the water and the air are cooled from the latent heat of evaporation. The free flowing water design of a conventional pad also reduce efficiency by reducing the surface area available to make contact with the air by flooding the irregular surface of the pad.

SUMMARY OF THE INVENTION

In a first aspect, an evaporative cooler includes a compact housing having a top panel, a base panel aligned with the top panel, and one or more side panels peripherally disposed between the upper and base panels. An air inlet formed in the upper panel and a plurality of openings providing air outlets are formed in at least one of the one or more side panels. The base panel is adapted to collect excess evaporation water and an air pervious evaporative pad formed of a fibrous material is enclosed within the housing. The evaporative pad comprises a base portion located within the base panel and peripherally raised portion extending between the base portion and the top panel and enclosed by the one or more side panels. The peripherally raised portion defines a cavity within the evaporative pad which is generally aligned with and opens toward the air inlet. A fan secured to the top panel directs air ambient the fan into the housing and through the evaporative pad where it is cooled. The cooled air is discharged through the air outlets. A conduit and flow control system is provided to supply evaporation water to the evaporative pad at a rate substantially equal to the rate at which the water evaporates.

In a second aspect, a method for cooling a space, comprises providing an evaporative pad contained within a housing and introducing water into the housing for absorption by the pad. The pad comprises a base portion and peripherally raised walls and is formed from a water absorbing and air pervious material. The housing comprises a water-tight base and an air outlet. A volume of air from outside the space is directed into the recess in the pad and the air is cooled by passing it through the pad and delivered into the space to be cooled. Unabsorbed water is collected in the base and it is determined whether excess unabsorbed water is present in the base. If unabsorbed water in excess of a predetermined quantity is sensed, the supply of water is shut off until the excess water has evaporated.

In a third aspect, a cooler pad for an evaporative cooler includes a base layer and a plurality of peripherally raised walls formed of an air pervious fibrous material. Each peripherally raised wall has a first side forming a peripheral side of the pad and an opposite second side facing a recess formed in the pad for receiving water.

One advantage of the present invention is the provision of an improved evaporative cooler which can replace or which can be used in conjunction with a compressor-type air conditioning unit.

Another advantage of the present invention is the provision of a cooler which is primarily designed to cool air, not water.

Another advantage of the present invention is an improved pad design with a center intake and three hundred and sixty-degree discharge design. This reduces the back pressure against which the fan must work, allowing the use of axial fans instead of blower-type or squirrel cage fans.

Another advantage of the present invention resides in its pad design which allows placement of the fan upstream of the evaporative pad, thus reducing the noise in the living area.

Still another advantage of the present invention is that is compact enough to allow the entire cooling chamber to be located within the living area, and thus, does not absorb heat from outside air or radiant heat from the sun.

Yet another advantage is the provision of an evaporative cooler having increased efficiency. The industry standard temperature differential is about 11° C. (20° F.). The cooler according to the present invention runs at about a 20° C. (35° F.) differential.

Yet another advantage of the present invention resides in that water does not accumulate, or is kept to a minimal amount, in the discharge pan. This obviates the need for drainage or the recycling of excess water and prevents water from sloshing or spilling out of the pan, even when the unit is tilted or used in a moving vehicle.

Another advantage is the compact design, which provide a light weight unit which can be mounted on a tent style pop-up camper or other vehicle type that could not support the weight of a conventional cooler, much less a compressor-type air conditioner.

Still another advantage of the subject invention is the reduced overall height, which allows the use of a shorter evaporator pad. This shorter pad allows the water to draw itself up into the pad at a high enough rate to eliminate the need for an internal pump to circulate water across the pad.

DETAILED DESCRIPTION OF THE INVENTION

Figure 1:
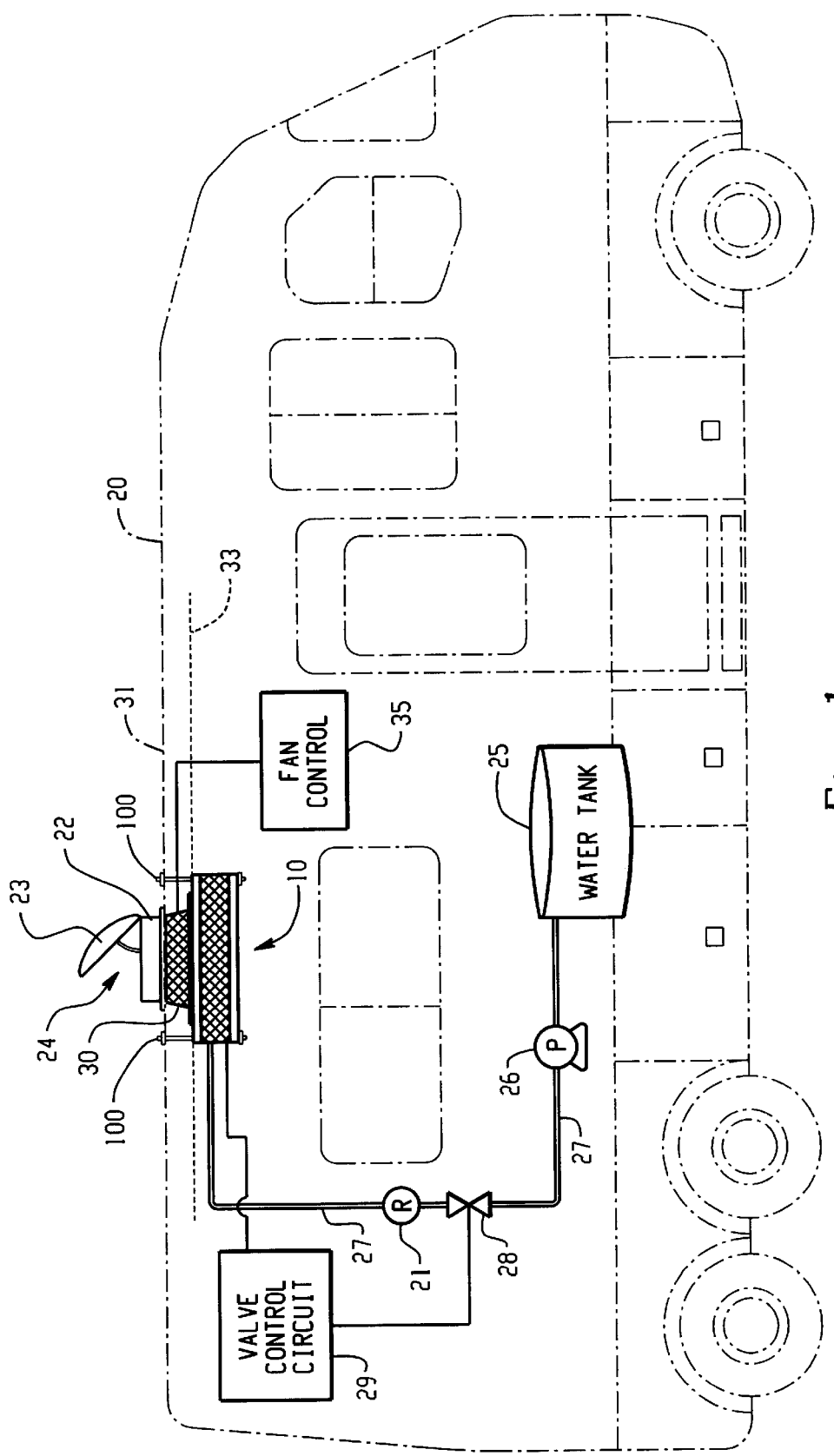
FIG. 1 is a schematic diagram of an evaporative cooling system of the present invention used in conjunction with a motor home vehicle.

Referring now to FIG. 1, there is shown an evaporative cooling system 10 used in conjunction with a motor home vehicle 20, shown in phantom. The cooling unit 10 is advantageously sized to capitalize on the presence of a roof vent 22 of the type typically present in such vehicles which extends between interior and exterior vehicle roof panels 31 and 33. A fan 30 extends into the roof vent 22, which may have a cover 23 to prevent the entry of rain and other environmental elements. Roof vent 22 is shown in an open position to provide an air inlet 24. The fan 30 is connected to a fan controller 35 which is in turn connected to a power supply (not shown). The fan controller 35 includes an on/off switch and optionally, a multi-speed fan motor control to control the degree of cooling provided. Preferably, power is provided by the electrical system of the vehicle 20, such as a 12 V power supply, although a dedicated power supply, such as a battery, household AC power, and so forth can also be used.

As shown in FIG. 1, the compact design allows the entire cooling chamber to be located inside the living area. This allows the subject cooler to operate at a higher level of efficiency than the conventional designs, which typically have the cooling chamber mounted outside the living area where it absorbs heat from the outside air and is subject to radiant heat from the sun.

A water reservoir 25 and a water pump 26 provide water to the unit 10 via water line 27. An electrically controlled valve 28, such as a solenoid valve or the like, controls the flow of water into the interior of the cooling unit 10. Valve control circuitry 29 is electrically coupled to the valve and one or more of liquid sensors 96 (see FIG. 2) within the unit 10 to sense excess water at one or more plurality of locations in the base of the unit and which closes the valve in response thereto. After sufficient liquid has evaporated so that excess water is no longer detected, the valve 28 is opened and water is then pumped into the unit 10. In this manner, the average rate of water flow is substantially equal to the rate of water evaporation. it will be recognized that it will take some amount of time for excess water to migrate through the evaporative pad and reach the sensors, and, as such, a small amount of excess water will tend to be added during this time. Thus, as used herein, a water flow or addition rate "substantially" equal to the rate of water evaporation is not intended to preclude the accumulation of small amounts of excess water added due to such time delay. Preferably, the valve control circuitry 29 and the electric valve 28 are powered by the electrical system of the vehicle 20, although the use of a dedicated power supply, such as a battery, household AC power, and the like, is also contemplated.

Optionally, a pressure regulating device 21, such as a metering orifice, needle valve, globe valve, or other flow reduction valve is provided to control the flow velocity of the water in line 27. Again, a small amount of excess water will be added during the time it takes excess water to migrate to the water sensors. Thus, the maximum level or quantity of excess water that can accumulate in the base pan is advantageously controlled by increasing or decreasing the flow rate using the optional valve 21.

Advantageously, the water tank 25 and the pump 26 are part of a preexisting water system of a type commonly present in such vehicles. In an alternative embodiment, however, a dedicated, stand alone water reservoir and water pump are employed with the cooling unit 10, for example, in vehicles not having an existing water system, or where taxing the potable water supply is not desired.

Figure 2:
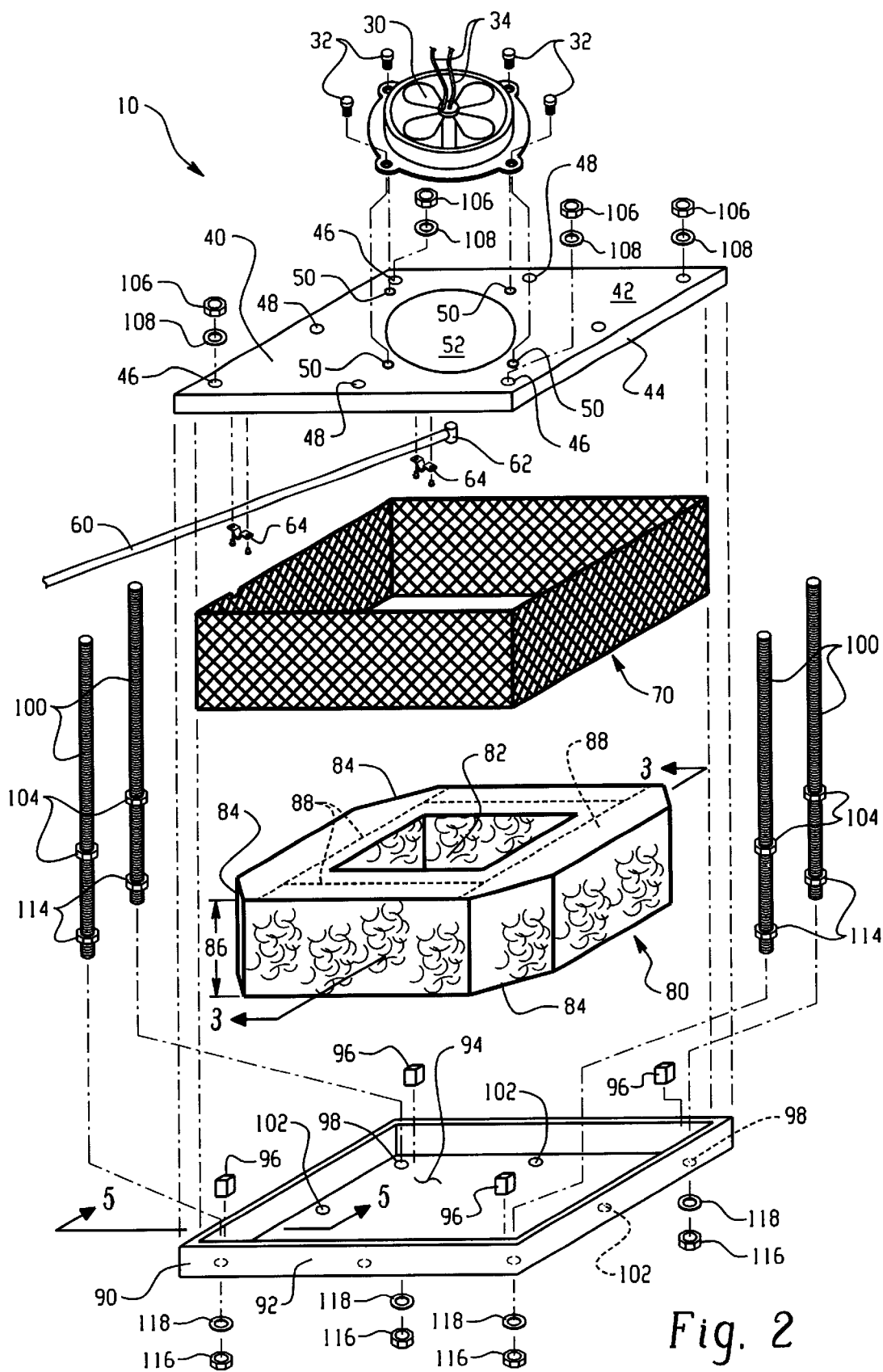
FIG. 2 is an exploded perspective view of the cooling assembly of the present invention.

Referring now to FIG. 2, the evaporative cooler 10 includes an upper housing shell 40 comprising a generally planar surface 42 bounded by peripheral, downwardly extending vertical walls 44. The fan 30, preferably an axial fan, and most preferably a low profile axial fan, is mounted over an air inlet opening 52 in the upper housing shell 40. The fan is fastened to the upper housing shell, for example, via screw-type or other fastening means 32 engaging the housing of the fan 30 and aligned fastener receiving holes 50 formed in the upper housing shell 40. Other air pumps, such as blower style (squirrel cage) fans, are also contemplated. In operation, air is forced by the fan 30 through opening 52 into the interior of the unit 10 for cooling.

A base housing shell 90 is aligned with the upper housing shell and comprises a base surface 94 bounded by peripheral, vertically raised walls 92. The upper and base housing shells are formed from a generally rigid, water tight material, preferably molded plastic and the like. Alternately, the base housing shell is formed from a material having a high thermal conductivity, such as a metal or metal alloy, preferably aluminum. The use of a thermal conductor provides thermal transfer from the living area or other compartment to be cooled into the cooling chamber of the unit 10, thus further cooling the living area and facilitating the evaporation process.

Within the base shell 90 there are a plurality of peripherally disposed water sensors 96, preferably located at the corners. The water sensors 96 are electrically coupled to the valve control circuitry 29 and preferably comprise a plurality of liquid sensing switches.

The switches 96 are normally in one of an open or closed state when no excess water is present at the switch location and the other state when excess water, e.g., water which cannot be absorbed by the evaporative pad 80, is present. When a preselected number, preferably any one, of the switches are detected by the control circuit 29 to be in the state indicating the presence of water, the valve 28 is closed. In this manner, the water flow controlled method of the present invention keeps the pad 80 generally saturated without flooding the pad. This increases efficiency, since flooding the pad decreases the surface area of the pad at which evaporation can occur. Since water in the base pan is not allowed to accumulate beyond a level at which the water sensor detects the presence of water, the present design is also resistant to spilling, which is particularly advantageous in a moving vehicle. The need to recirculate excess water back to the top of the pad, or to otherwise drain excess water, is also eliminated, thus simplifying construction and providing thermodynamic and other benefits.

Since the water evaporated is held in suspension in the pad 80 by the surface tension of the pad material, this surface tension demands more energy to break the bond before the liquid water can change into a vapor. This results in a lower discharge air temperature than if the water evaporated is primarily bonded only to itself, as is the case in the conventional cooler art designs in which the pad is flooded or water is circulated over the pad in a free flowing manner.

The pad 80 acts as a baffle, stopping the water from sloshing in the pan. The vertical walls 92 of the base pan 90 are preferably sufficiently raised such that the unit can be tilted during operation and not spill, for example, up to a twenty-five degree angle. Thus, the unique pad configuration and method of level control allows only a minimal amount of water to accumulate in the pan, making the unit particularly suited for use in a moving vehicle.

Additionally, by minimizing excess water, tie weight of the unit is minimized. For example, in a unit as shown in FIG. 2 having a pad measuring 20×20 inches was found to have weight less than 15 kg (33 lbs) wet.

Figure 5:
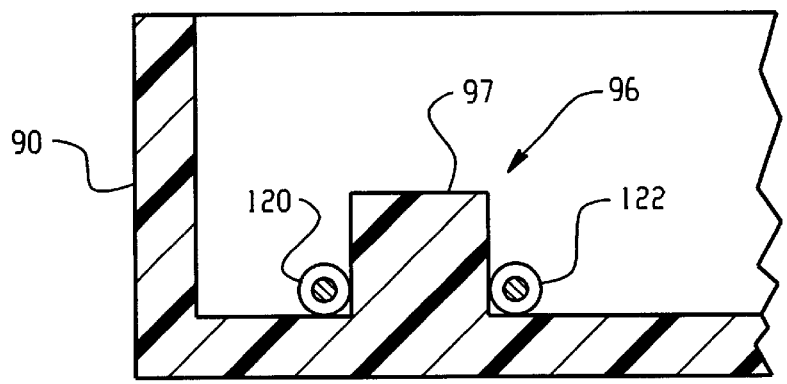
FIG. 5 is a fragmentary cross-sectional view taken along the lines 5—5 of FIG. 2.
Figure 6:
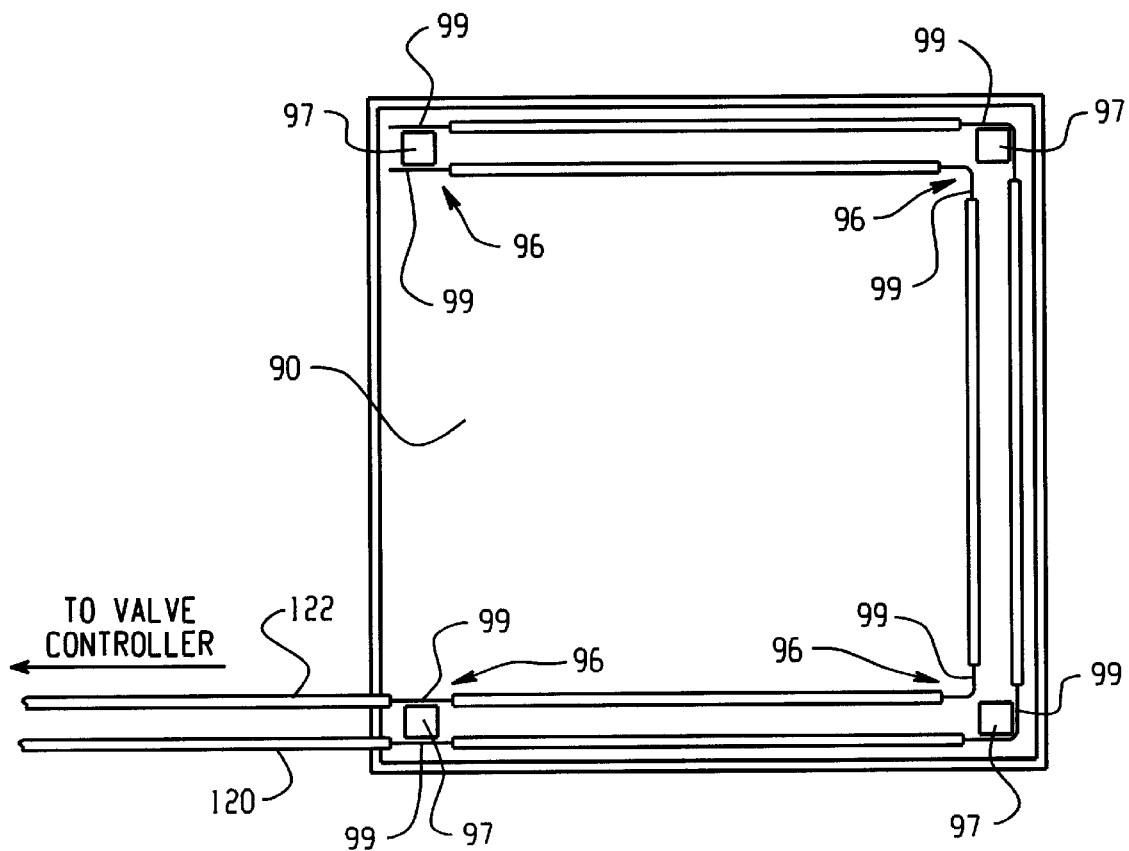
FIG. 6 is a top plan view of a series of water sensing switches employed with the present invention.

In a preferred embodiment, the switches are normally open when dry and closed in the presence of water. A preferred embodiment is shown in FIG. 5, which is a fragmentary sectional view taken along the lines 5—5 in FIG. 2. The water sensor 96 consists of a pair of wires 120 and 122 which ire a part of an electrical circuit, each disposed on opposite sides of a electrically insulating protrusion 97 extending from the base surface 94. The wires are electrically insulated, with exposed or stripped regions 99 in which the insulation is removed in the vicinity of the protrusions 97, which prevents short circuiting by direct contact of the exposed wire. In this manner, standing water in the base shell at any one or more of the four corners of the base shell causes a short circuit condition. A top view of this arrangement is shown in FIG. 6. Of course, the wires 120 and 122 forming the liquid sensors 96 could be bare along other peripheral regions to provide a greater chance of detecting excess water, or could be hare along their entire lengths, so long as they are prevented from creating a short circuit by direct contact, e.g., by placement of one or more electrically insulating physical barriers therebetween. In an embodiment not shown, an annular raised electrically insulating physical barrier is provided between the wire Pair. Transverse channels, gaps, or other openings in the barrier can be provided to permit excess water to travel therethrough, or alternately, the height of the barrier can be selected to provide a water level control, such that contact is made only when the water depth in the base housing shell is greater than the height of the barrier. Similarly, the wires can be replaced with a printed circuit having covered and exposed regions in analogous fashion.

Other types of liquid sensors 96 are also contemplated. For example, float switches, capacitance switches, humidistats, and the like, can be used to detect the presence of excess water.

Referring again to FIG. 2, the water absorbing, air permeable evaporative pad 80 is sandwiched between the upper and base housing shells. The vertical thickness 86 of the pad 80 is greater than the combined vertical extent of the upper and base shell peripheral walls 44 and 92, respectively, so as to provide a 360° outlet for the air stream forced in by the fan 30. The pad 80 is formed from a water-absorbing material, such as natural fibers, e.g., wood or cellulose fibers, or synthetic fibers, and has a recessed area 82 centrally formed therein and opening toward the aperture 52 in the upper housing shell. Advantageously, the pad 80 is formed from material of the type conventionally used as humidifier pads, and may be built up from several pieces of material to form the recessed configuration. In a preferred embodiment, the pad 80 is formed from elongate strips of intersecting fibers, such as paper or other fibrous mat material. Preferably, the pad 80 is treated with an antimicirobial agent for the prevention and control of bacteria and mold.

The pad design of the present invention has a number of advantages. By providing a center intake with a 360° discharge design, back pressure is reduced, allowing the use of axial fans instead of blower style or squirrel cage fans. Axial fans require less energy per cfm.

By disposing the fan exteriorly of the pad 80 and base shell 90, noise produced by the fan and other outside noise entering the interior compartment of the vehicle is reduced. The pad itself has acoustic energy absorbing properties. The base shell has sound-reflective properties, thus tending to reflect sound energy back up and away from the living space.

In an alternate embodiment, the pad 80 is formed of a fibrous material and has a thermally conductive material embedded therein. Preferably the fibrous material is impregnated with the thermally conductive material, most preferably at the time the pad material is being formed. The conductive material is preferably a metal, such as aluminum. the aluminum or other metal is present in a structural form that does not prevent airflow through the pad and is preferably a finely divided form, such as a powder or fibers. In a preferred embodiment, aluminum fibers such as chopped strand or whiskers are used, e.g. having a diameter of about 1–10 mils, more preferably about 3–5 sills, and about 10–100 mils in length, more preferably about 50–60 sills in length. Preferably, the pad is impregnated with the metal by incorporating the fibers into the raw wood or other fibers during fabrication of the evaporative pad material. However, application to preformed pad material is also contemplated, e.g., by spraying a gas (e.g., air) or liquid suspension of the fibers onto the pad material. Alternately, the conductive material can be applied as a coating on some of the fibers forming the pad material. Preferably, the metal fibers or other particles intertwined with the fibers of the pad are securely and generally permanently embedded within the evaporative pad material so as to eliminate the potential for the ingestion of airborne fibers into the lungs. Thus, depending on the specific evaporative pad material used, metal particles are advantageously employed which are sufficiently large (e.g., relatively long fibers or relatively large particles or pellets) to render them nonrespirable and/or generally nonremovable from the pack The amount of conductive material used is preferably up to about 30% by volume and 1% to 30% by weight of the pad material, more preferably about 20% by volume or less. While not intending to be bound by any particular theory, inserting or impregnating the pad with a thermally conductive material in accordance with this teaching is believed causes heat to be absorbed into the thermally conductive material, effectively lowering the air temperature. the heat absorbed by the conductive material transfers to the water suspended in the pad, thus increasing the colder rate and the cooling effect on the air. The use of a thermal conductor such as aluminum increases the transfer rate of the heat from the air to the water, as opposed to the transfer rate of air to water, because the aluminum has a higher level of thermal conductivity than water alone.

An air permeable and preferably thermally conductive mesh 70, e.g., constructed of aluminum or other metal, is peripherally disposed around the pad 80. The mesh is generally rigid to retain and protect the pad. The mesh 70 may be formed from separate side pieces, or may be integrally formed from a single piece of material. Optionally, air permeable, rigid, and preferably thermally conductive structural members 88 are embedded within the evaporative pad to provide further structural support of the pad material. Although the support structures 88 can have a construction similar to the encasing material 70, the support members 88 are advantageously formed from a material that is less rigid than support member 70. In this manner, the supports 88 provide support to the pad while also allowing some compression of the pad material, unlike the encasing structure 70 which is resistant to compression. The pad 80 is optionally provided with corner cutaway areas 84 which facilitates assembly and excess water detection by corner mounted liquid sensors.

Figure 3:
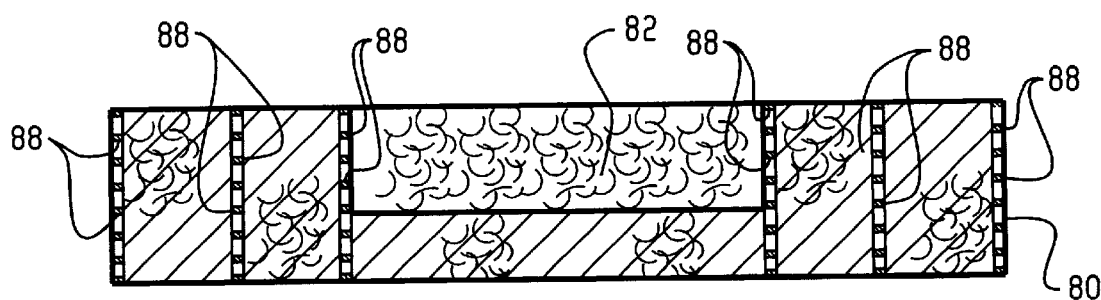
FIG. 3 is a cross-sectional view taken along the lines 3—3 of FIG. 2.
Figure 4:
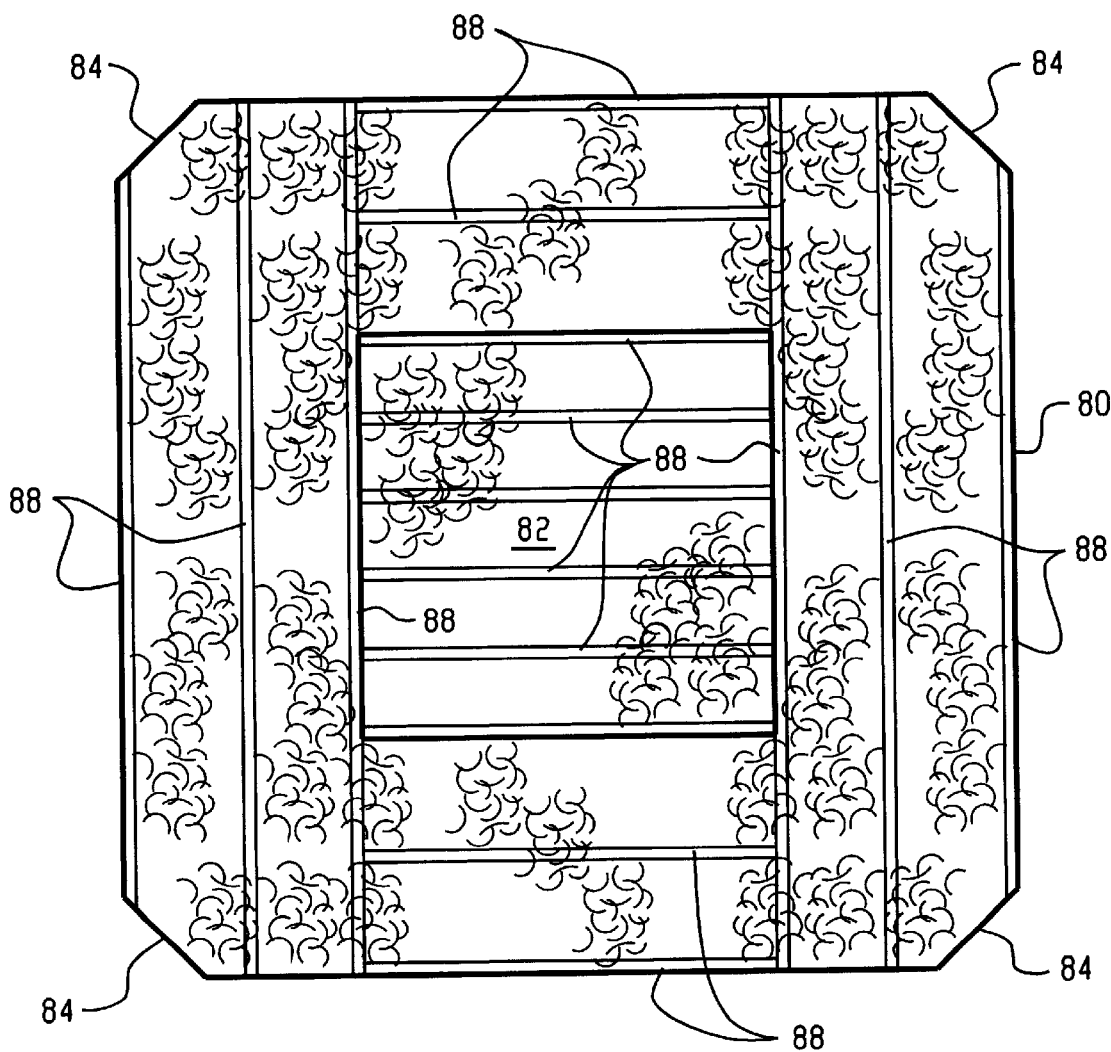
FIG. 4 is a top plan view of an exemplary evaporative pad formed in accordance with the present invention.

Referring now to FIG. 3, there is shown a sectional view of the pad 80, taken along the lines 3—3 in FIG. 2. FIG. 4 shows a top plan view of the pad 80. As is shown in greater detail, the pad 80 comprises a recess 82 bounded by a base and four peripherally raised sides. Embedded vertically extending mesh panels 82 support the pad 80.

Referring again to FIG. 2, the upper and base housing shells are fastened together on opposite sides of the pad 80, which is enclosed by the generally rigid peripheral enclosure 70. The enclosure 70 is retained at the top and bottom by the vertically extending walls 44 and 92 of the upper and base housing shells, respectively. Four threaded rods or bolts 100 secure the base and upper housings at each corner. The bolts 100 pass through holes 46 in the upper housing shell 40 and holes 98 in the base shell 90. The nuts 104 and 114 engage the inside, facing, surfaces of the upper and base housing shells, respectively. The spacing of the nuts 104 and 114 along the length of the bolts 100 is such that it generally matches the height 86 of the pad 80 and enclosure 70. Preferably, the height of the enclosing member 70 and the spacing of the nuts 104 and 114 is slightly smaller than the height 86 of the pad 80 in its uncompressed state to provide some degree of compression of the pad when the unit is assembled. Associated fastening hardware 106 and 108 engage the upper end of the bolts 100 passing through holes 46 and fastening hardware 116 and 118 engage the opposite end of the bolts 100 passing through holes 98. Optionally, holes 48 are placed along the peripheral sides of the upper housing shell, and aligned holes 102 are placed along the peripheral sides of the base housing shell, the additional holes for retaining additional fastening hardware such as additional bolts 100 and associated hardware. In one preferred embodiment, a total of eight fasteners 100 and associated hardware are used to secure the housing shells. Preferably, the bolts 100 are of sufficient length to extend upwardly through the roof of the vehicle 20, the bolts 100 also being used to fasten the unit to the roof of the vehicle.

In an alternative embodiment, the threaded rods 100 engage mating and vertically extending threaded bosses (not shown) formed in the base housing panel. Other mechanical fasteners are also contemplated for securing the unit to a vehicle or other structure to be cooled, such as a plurality of clips, screws, dogs, and the like.

A tube or hose 60 is disposed beneath the upper shell 40, and is preferably attached thereto via brackets 64 or other fastening means. The hose 60 carries water from the water pump 26 to the water outlet or nozzle 62, which is disposed over the recess 82 in the pad 80. Water is delivered from the outlet 62 into the recess 82 onto the pad 80. Preferably, the water is allowed to drop or trickle into the pad 82, since in operation of the present invention, spraying the water is unnecessary. The water moistens the pad 80 and any excess water is held in the base shell 90. The fan 30 forces air into and through the pad 80. As the air passes through the pad 80, it gives up heat to the evaporating water held by the pads, so that the air exiting through the sides of the unit is considerably cooler than the outside air entering the unit. The fan, being directed into the interior of the pad 80, also forces any water in the base shell away from the center unit, where it is either wicked into a nonsaturated region of the pad, or, if the pad is saturated, toward the water sensors 96. When water is sensed at any sensor, the control valve 28, or in the alternate configuration, a water pump, is shut off until a sufficient amount of water has evaporated and no water is detected at any sensor. In this manner, the flow of water is controlled to match the evaporation rate. Since the subject pad design allows the water to draw itself up into the pad, the need for an internal pump to circulate water across the pad is eliminated.

Figure 7:
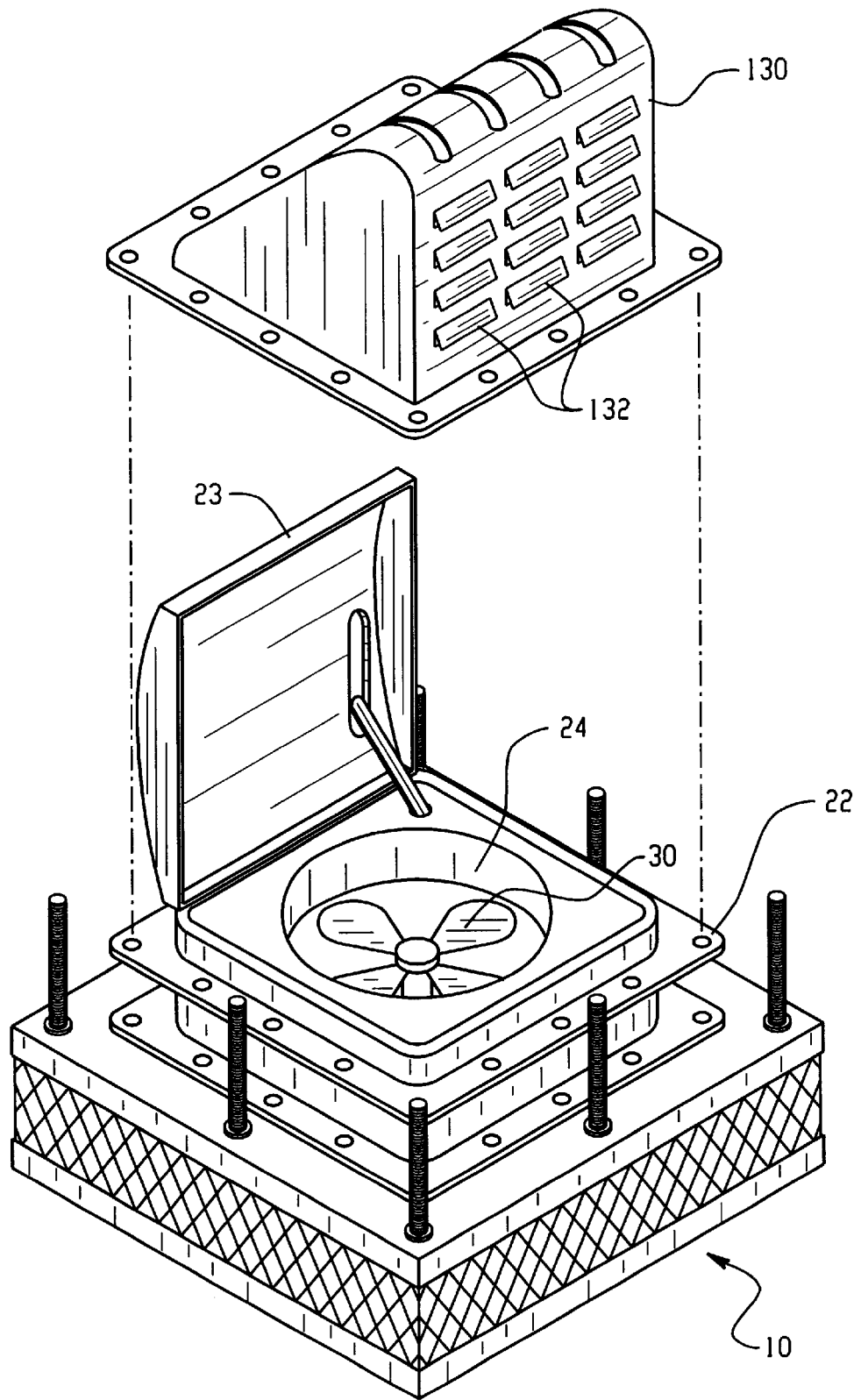
FIG. 7 illustrates the placement of an evaporative cooling system of the present invention with respect to a roof vent.

Referring now to FIG. 7, there is shown in greater detail a roof vent assembly 22 having an articulable lid 23 which is raised to provide an air inlet 24 to the evaporative cooler 10 mounted thereunder. An optional vent cap enclosure 130, which may be used in addition to or in lieu of the cover 23, includes a plurality of vent louvers 132 to permit air flow therethrough. It will be recognized that other types of roof vent covers may be employed which will direct air into the air inlet 24 due to forward motion of the vehicle to increase the efficiency of fan 30.

In a further embodiment, a conventionally designed cooler is modified to use the pad designed in accordance with the present invention. The pad is mounted in a heavily supported frame configured to retrofit the conventional style cooler. An adjustable timer relay supplies water to the pad in controlled increments, for example, by controlling the pump or valve so that the pump is run alternately in the on position for a first period of time to dampen the pad and then shutting off the water for a second period of time, the first and second periods of time being preferably user selectable. Although the time periods would vary according to a number of factors, such as pad material and capacity, ambient air temperature, fan or blower size and velocity, and so forth, in an exemplary embodiment, the pump is operated so that it runs in the on position for about fifteen seconds so as to dampen the pad and for about three minutes in the off position in alternating fashion. During the off time, the more energetic or hotter molecules of water would first evaporate, leaving cooler and cooler molecules of liquid. The leaner pad of the present invention has a greater evaporative surface area than a flooded pad and an energy saving would result from the pump off time. The new pad would thicker, e.g., about five inches thick instead of the one inch thick pad typical of the conventional coolers. The residence time of the air in the pad would increase, thus allowing a greater amount of water to be evaporated. This increases the amount of energy removed in the evaporation process, resulting in a lower discharge temperature.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An evaporative cooling apparatus comprising:
   a housing including a first panel, a second panel opposite the first panel, and one or more peripheral side panels extending between the first and second panels, the second panel adapted to collect excess evaporation water;

an air inlet formed in the first panel;

a plurality of openings providing air outlets formed in at least one of the one or more side panels;

an air pervious evaporative pad enclosed within the housing, the evaporative pad formed of a fibrous material, the evaporative pad comprising a base portion supported within the second panel and a peripherally raised portion extending between the base portion and the first panel and enclosed by the one or more side panels, the peripherally raised portion defining a cavity within the evaporative pad, the cavity generally aligned with and opening toward the air inlet;

a fan secured to the first panel for directing air ambient the fan into the housing, through the evaporative pad, and out the air outlets;

a conduit and flow control system to supply evaporation water to the evaporative pad at a rate which is substantially the same as a rate of evaporation of the water.

2. The evaporative cooling apparatus of claim 1, wherein the fan is secured to the exterior of the housing.

3. The evaporative cooling apparatus of claim 1, wherein said conduit and flow control system comprises:

a nozzle positioned to direct water from a water supply into said cavity;

an electronically controlled valve in fluid communication with the nozzle;

a liquid sensor positioned within the second panel to detect the presence of excess water therein;

a circuit electrically coupled to the liquid sensor and the valve, the circuit receiving a signal from the sensor and controlling operation of the valve in response to the signal to admit the passage of water only when excess water is not detected by said liquid sensor.

4. The evaporative cooling apparatus of claim 3, wherein the liquid sensor comprises one or more switches.

5. The evaporative cooling apparatus of claim 3, wherein the liquid sensor includes a switch comprising spaced apart electrodes which are electrically coupled when excess water is collected in the second panel.

6. The evaporative cooling apparatus of claim 3, wherein the liquid sensor includes a switch which is closed when excess water collected in the second panel reaches a predetermined depth.

7. The evaporative cooling apparatus of claim 1, wherein the evaporative pad further includes one or more vertically extending support members embedded therein.

8. The evaporative cooling apparatus of claim 1, further comprising a thermally conductive material embedded within the evaporative pad.

9. The evaporative cooling apparatus of claim 8, wherein the thermally conductive material comprises metal fibers.

10. The evaporative cooling apparatus of claim 8, wherein the thermally conductive material comprises aluminum.

11. The evaporative cooling apparatus of claim 1, wherein the second panel is formed from a thermally conductive material.

12. The evaporative cooling apparatus of claim 1, wherein the second panel is formed from aluminum.

13. The evaporative cooling apparatus system of claim 1, further comprising a water supply.

14. The evaporative cooling apparatus of claim 13, wherein the air inlet receives air from outside a vehicle and the air outlets deliver evaporatively cooled air into an interior compartment of the vehicle.

15. The evaporative cooling apparatus of claim 14, wherein the housing is secured to a roof of the vehicle.

16. The evaporative cooling apparatus of claim 15, wherein the fan and the flow control system are powered by an electrical system of the vehicle.

17. The evaporative cooling apparatus of claim 14, wherein the flow control system includes an electronic valve controlled by one or more water sensors within said housing.

18. The apparatus of claim 1, wherein the fibrous material comprises cellulose.

19. The apparatus of claim 1, wherein the pad further comprises:

a plurality of air pervious structural members embedded within the fibrous material.

20. The apparatus of claim 19, wherein the structural members are formed from a thermally conductive material.

21. The apparatus of claim 20, wherein the structural members comprise sheets of a first wire mesh material.

22. The apparatus of claim 21, wherein the side panels of the pad are air pervious.

23. The apparatus of claim 22, wherein the side panels is formed from a second wire mesh material.

24. The apparatus of claim 23, wherein the second wire mesh material is more rigid than the first wire mesh material.

25. The apparatus of claim 20, wherein the thermally conductive material comprises aluminum.

26. The apparatus of claim 25, wherein the conductive material comprises metal fibers intertwined with fibers of said fibrous material.

27. The apparatus of claim 26, wherein the metal fibers are aluminum fibers.

28. The apparatus of claim 27, wherein the aluminum fibers are present in the pad in an amount ranging from about 1% to about 30% of the pad by weight.

29. An apparatus for cooling a space, comprising:

an evaporative pad contained within a housing, the pad comprising a base and peripherally raised walls formed from a water absorbing and air pervious material, the housing comprising a water-tight base and an air outlet;

a means for introducing water into the housing for absorption on the pad;

a means for directing a volume of air from outside the space into the pad, the air being cooled by passing the air through the pad;

a means for delivering the cooled air into the space to be cooled;

a means for collecting unabsorbed water in the base; a means for sensing whether unabsorbed water in excess of a preselected quantity has accumulated in the base and, if excess water is sensed, shutting off the supply of water until the excess water has evaporated.

30. A method for cooling a space, comprising:

positioning an evaporative pad within a recess of a housing, the pad comprising a base and peripherally raised walls formed from a water absorbing and air pervious material, the housing comprising a water-tight base and an air outlet;

introducing water into the housing for absorption on the pad;

directing a volume of air from outside the space into the recess of the housing;

cooling the air by passing the air through the pad;

delivering the cooled air into the space to be cooled;

collecting unabsorbed water in the base;

sensing whether unabsorbed water in excess of a preselected quantity has accumulated in the base; if excess water is sensed, shutting off the supply of water until the excess water has evaporated.

* * * * *